United States Patent
Malyak et al.

(12)

(10) Patent No.: US 6,515,750 B1
(45) Date of Patent: Feb. 4, 2003

(54) INTERFEROMETRIC SYSTEM FOR AND METHOD OF TESTING AND CHARACTERIZING MICRO-OPTIC COMPONENTS

(75) Inventors: Phillip H. Malyak, Canton, MA (US); John S. Berg, Bellingham, MA (US); Angela Holh-Abi Chedid, Beverly, MA (US); David L. Kent, Framingham, MA (US); John M. Watson, Haverhill, MA (US)

(73) Assignee: Zygo Corporation, Middlefield, CT (US)

( * ) Notice: Subject to any disclaimer, the term of this patent is extended or adjusted under 35 U.S.C. 154(b) by 0 days.

(21) Appl. No.: 09/518,852

(22) Filed: Mar. 3, 2000

Related U.S. Application Data (60) Provisional application No. 60/153,459, filed on Aug. 25, 1999.

(51) Int. Cl.[7] .................................................. G01B 9/02
(52) U.S. Cl. ........................................ 356/512; 356/515
(58) Field of Search ................................. 356/450, 511, 356/512, 495, 513, 514, 515, 497

(56) References Cited

U.S. PATENT DOCUMENTS 5,112,129 A * 5/1992 Davidson et al. ........... 356/497

OTHER PUBLICATIONS

D. Malacara, "Twyman–Greem Interferometer," Chap. 2 in *Optical Shop Testing, 2nd Edition,* D. Malacara, Ed., pp. 51–94, John Wiley & Sons, New York (1992).

D. Malacara amd S. L. DeVore, "Interferogram Evaluation and Wavefront Fittimg," Chap. 13 in *Optical Shop Testing, 2nd Edition,* D. Malacara, Ed., pp. 461–472, John Wiley & Sons, New York (1992).

K. Creath and A. Morales, "Contact and Noncontact Profilers," Chap. 17 in *Optical Shop Testing, 2nd Edition,* D. Malacara, Ed., pp. 700–703, John Wiley & Sons, New York (1992).

* cited by examiner

*Primary Examiner*—Samuel A. Turner
(74) *Attorney, Agent, or Firm*—Fish & Richardson P.C.

(57) ABSTRACT

Three aspect of a interferometer system for testing and characterizing micro-optical components an automatic system for testing a plurality of micro-optical components in sequence, a special holding device including a vacuum chuck arrangement allows for individual micro-optical components to be picked up and held during testing, and a modified Linnik objective is used with short coherent light and preferably a opaque reference sphere to carry out reflection tests on micro-optical component having at least one curved surface.

33 Claims, 10 Drawing Sheets

INTERFEROMETRIC SYSTEM FOR AND METHOD OF TESTING AND CHARACTERIZING MICRO-OPTIC COMPONENTS

CROSS-REFERENCE TO RELATED APPLICATIONS

This application is based upon provisional application, U.S. Ser. No. 60/153,459 filed Aug. 25, 1999.

STATEMENT REGARDING FEDERALLY SPONSORED RESEARCH

Not Applicable

REFERENCE TO MICROFICHE APPENDIX

Not Applicable

BACKGROUND OF THE INVENTION

The present invention relates generally to equipment for and methods of testing and characterizing micro-optics, and more particularly to interferometers for and interferometric methods of testing and characterizing such components.

BACKGROUND OF THE INVENTION

The with advent of optical communications, there has been a sudden demand for suitable equipment for testing and characterizing the very small, micro-optical components, or "micro-optics", that are used as a part of optical network infrastructure. Such components include, for example, very small lenses for focusing a laser beam, modulated with information, into and out of each fiber of a fiber optic cable. The micro-optics, typically ranging from approximately 10 μm to 3 mm in diameter, are mass produced, and therefore must be tested and characterized to ensure that they meet predetermined specifications prior to installation. Such testing must be thorough, accomplished in minimal time and be accurate.

SUMMARY OF THE INVENTION

The present invention is an improved system specifically adapted to automatically test and characterize a plurality of micro-optics.

In accordance with one aspect of the invention, a system comprises:
(a) a micro-optical component support constructed and arranged so as to support an array of micro-optical components under test;
(b) an interferometer constructed and arranged for generating a test beam for use in testing micro-optical components under test; and
(c) a controller constructed and arranged so as to automatically move the support and test beam relative to one another while moving the reference surface so as to automatically and sequentially test the micro-optical components.

In one preferred embodiment the interferometer comprises:
(i) a source of radiation constructed and arranged so as to define a beam of radiation,
(ii) system components, including a system component defining a reference surface, constructed and arranged so as to define at least two paths for the beam so that the beam can be separated into at least a test beam and a reference beam, the test beam being directed toward the support, and the reference beam being directed to the reference surface; and
(iii) a reference support constructed and arranged so as to move the reference surface so as to vary the path length of the reference beam.

The system component defining the reference surface can include a curved surface that defines the reference surface and determined by the specifications of each of the micro-optical components, wherein the curved surface is preferably a spherical surface. The system comprises structure to allow the selection of either a source of long coherent radiation or a source of short coherent radiation depending upon the test performed by the system. The source of coherent radiation is preferably selected when testing the transmission characteristics of the each of the micro-optical components, the source of short coherent radiation is selected when testing the reflection characteristics of each of the micro-optical components.

The micro-optical component support is preferably adapted to move in two mutually orthogonal directions each substantially normal to the path of test beam, while the reference support is movable in a direction substantially parallel to the path of the test beam.

In another embodiment the interferometer includes a second reference support for supporting a return reflecting surface for receiving the test beam transmitted through each micro-optical component, and reflect the test beam back through the micro-optical component under test. The second reference support is also preferably movable in a two mutually orthogonal directions each substantially normal to the path of the test beam so as to adjust the lateral position of the return reflecting surface relative to the test beam so that a focal point of the reference surface is properly positioned relative to a focal point of the micro-optical component under test.

In accordance with yet embodiment a micro-optical component holding structure, attached to the interferometer, is provided for holding each micro-optical component relative to the test beam.

Another embodiment the micro-optical component support structure includes pick-up structure for picking up each micro-optical component.

And in another embodiment, the micro-optical support structure includes structure constructed and arranged so as to pick up each micro-optical component, move the component relative to the test beam so as to properly position the micro-optical component, and hold the micro-optical component relative to the test beam during testing of the micro-optical component.

In a preferred embodiment the micro-optical structure includes a vacuum chuck assembly constructed and arranged so as to pick up and hold each micro-optical component relative to the test beam, wherein the vacuum chuck assembly includes a geocentric positioning device for positioning the micro-optical component relative to the test beam.

In accordance with another aspect of the invention, a system comprises:
(a) a micro-optical component support constructed and arranged so as to support an array of micro-optical components under test;
(b) an interferometer constructed and arranged for generating a test beam for use in testing micro-optical components under test;
(c) micro-optical component holding structure, attached to the interferometer, for holding each micro-optical component relative to the test beam; and (d) a controller constructed and arranged so as to automatically pick up and holding each micro-optical component with the holding structure.

In one embodiment the micro-optical component holding structure includes pickup structure for picking up each micro-optical component.

In another embodiment, the micro-optical holding structure includes structure constructed and arranged so as to pick up each micro-optical components move the component relative to the test beam so as to properly position the micro-optical component, and hold the micro-optical component relative to the test beam during testing of the micro-optical component. The micro-optical holding structure preferably includes a vacuum chuck assembly constructed and arranged so as to pick up and hold each micro-optical component relative to the test beam. The vacuum chuck assembly preferably includes a geocentric positioning device for positioning the micro-optical component relative to the test beam.

In accordance with another aspect of the invention, a system for testing micro-optical components having at least one optically curved surface, comprises:

(a) a support for supporting at least a micro-optical component under test;

(b) a source of a beam of radiation directed along a beam path;

(c) a beam divider constructed and arranged so as divide the beam of radiation so as to generate a test beam along a test beam axis and a reference beam along a reference beam axis;

(d) a first objective lenses system positioned so as to direct the reference beam on a corresponding micro-optical reference component positioned on the reference beam axis positioned a first predetermined distance from the beam divider and reflect an image of the reference component on the beam divider;

(e) a second objective lenses system positioned so as to direct the test beam on a micro-optical reference component under test positioned a second predetermined distance from the beam divider and reflect an image of the component under test on the beam divider; and (f) imaging optics for imaging the interference pattern created by the reflection of the image of reference component and the image of the component under test.

In one embodiment, the source of a beam of radiation if a short coherent light source. In another embodiment the first and second predetermined distances are substantially the same, and the system further includes structure for adjusting either the first or second predetermined distance so as to create phase-shifting between the test and reference beams.

In yet another embodiment the reference component is a sphere, and the sphere is opaque.

BRIEF DESCRIPTION OF THE DRAWINGS

The foregoing and other objects of this invention, the various features thereof, as well as the invention itself, may be more fully understood from the following description, when read together with the accompanying drawings in which.

DETAILED DESCRIPTION OF THE INVENTION

In the drawings like numerals are used to designate functionally similar or identical parts.

Interferometer System.

In accordance with at least one aspect of the invention, an improved system has been developed for testing and characterizing micro-optics. The system preferably includes a phase-shifting interferometer for testing and/or characterizing micro-optics (i.e. optics ranging from approximately 10 $\mu$m to 3 mm in diameter). The instrument is compact and modular in construction, allowing micro-optics to be tested and characterized under a variety of test conditions. For example, (1) the illumination profile can be converging, diverging or collimated, (2) the operating wavelength can be varied by changing the source laser, collimator assembly and/or the detector array of the imaging device, (3) image magnification and conjugate locations can be varied in moderate amounts by adjusting the position of the lens elements in the imaging leg of the interferometer, while larger changes to magnification and conjugate positions can be made by removing the "standard" imaging leg and replacing it with an interchangeable "optional" assembly, and (4) the interferometer can be operated in any orientation, thereby allowing micro-optics to be tested in any orientation.

Figure 1:
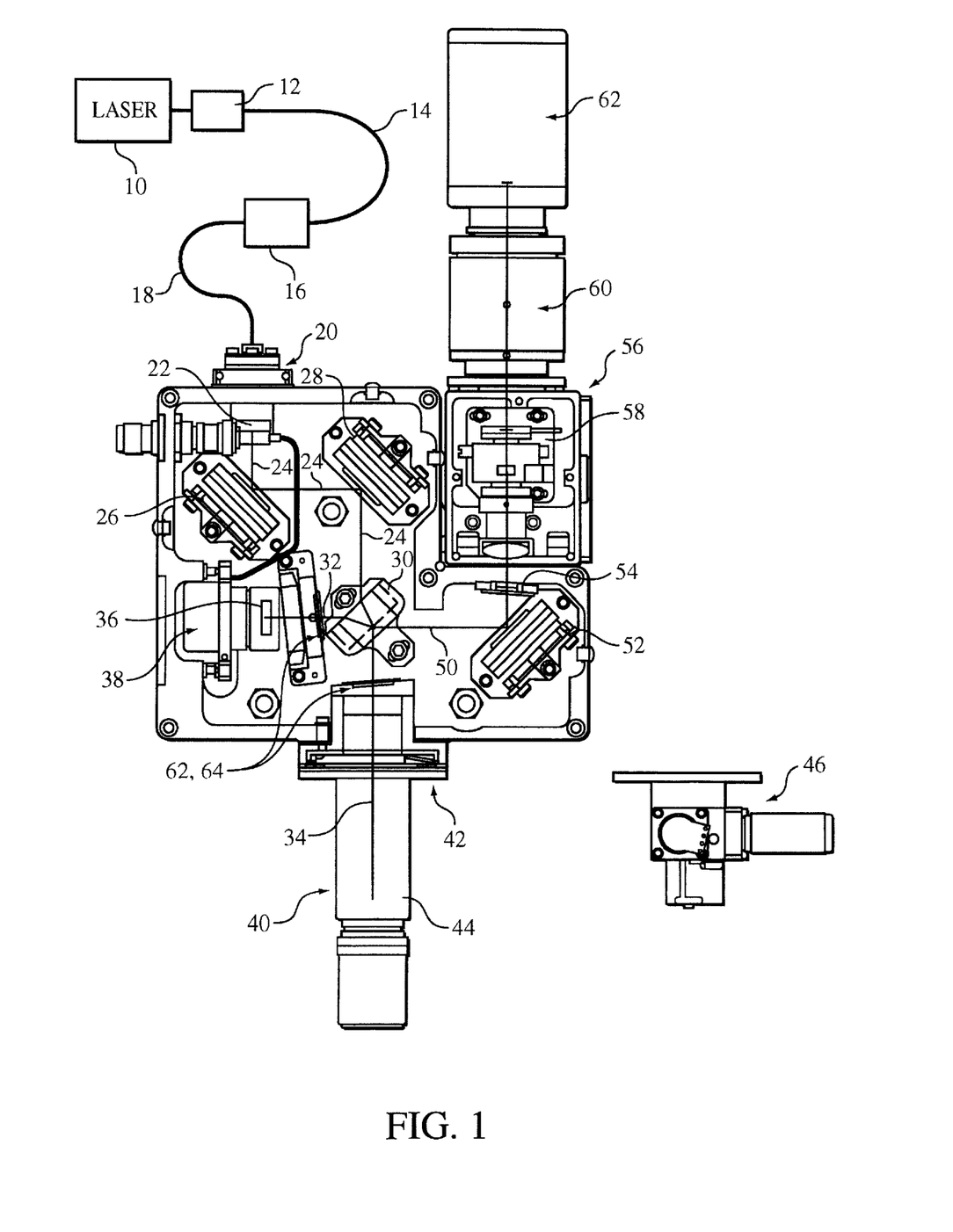
FIG. 1 is a top view, partially in schematic form, of one embodiment of an interferometer system incorporating the principles of the present invention.

A preferred embodiment of the interferometer is shown in FIG. 1. In the illustrated embodiment, the illumination source is a coherent source of radiation. The preferred source of coherent radiation includes a frequency stabilized laser 10, coupled with the coupler 12 through a single-mode polarization maintaining optical fiber 14 to a fiberoptic attenuator 16 for adjusting the intensity of the input laser beam. The attenuator can be controlled manually, or alternatively, it may be set automatically, using, for example, a motorized control system (not shown). The output end of the fiber attenuator 16 is connected through a single-mode polarization maintaining optical fiber 18 to a collimator assembly 20, the latter including a suitable collimator. The wavelength of the coherent source can be easily changed by replacing the laser and collimator assembly designed for one wavelength for corresponding equipments designed for another. Alternatively, the wavelength can be changed by switching to an alternative laser source and refocusing an adjustable collimator (manually or automatically). The collimator is adjusted by changing the distance between the fiber and collimating lens. Collimation is preferably established by either one of two methods: (1) apply a collimation tester (e.g. a shear plate) at the output of the interferometer, or (2) use the interferometer itself to determine the collimation by employing the inherent difference in optical path between the imaging and reference legs of the interferometer.

The incident beam is transmitted through input optics 22 along an incident beam optical axis 24 and reflected off a first reflecting surface of assembly 26 to a second reflecting surface of assembly 28, and thence off the latter to beamsplitter 30. Beamsplitter 30 divides the incident beam into two separate b axes or paths: the reflected or reference beam along the reference beam optical axis or path 32 of the reference leg of the interferometer, and the transmitted, test or imaging beam along the imaging beam optical axis or path 34 of the imaging leg of the interferometer. The referenced beam thus illuminates the reference leg, while the imaging beam illuminates the imaging leg of the interferometer. The reflected beam is incident on a reference reflecting surface 36, preferably in the form of a phase-shifting mirror of the mirror assembly 38, reflecting off this surface and returning to the beamsplitter 30. The transmitted beam (which is collimated) directed along the optical axis 34 is directed through the interferometer head 40 to a micro-optic component under test (CUT), not shown in FIG. 1.

The imaging leg of the interferometer further preferably includes a mount 42 to permit different interferometer heads including different lenses and test fixtures to be interfaced to the interferometer. The mount may be any type of mount, such as a bayonet, magnetic, electrically locking, or other type of mounting, allowing lens assemblies and test fixtures to be properly positioned relative to the optical axis 34, and in particular the test beam. The imaging optics 44 shown attached to the interferometer in FIG. 1 can be of the type used to provide converging illumination, collimated illumination or diverging illumination to the CUT depending on the test performed and the nature of the micro-optic under test. Alternatively, a tip-tilt chuck assembly (shown at 46 and described in greater detail hereinafter with reference to FIGS. 5 and 6) can interface to the interferometer and used for testing and alignment with collimated light. As an added feature the tip/tilt assembly 46 is preferably controlled with a pair of motors (shown more clearly in FIGS. 5 and 6) so as to automatically align the CUT to the optical axis 34 of the test beam of the interferometer. While the head 40, and tip-tilt assembly 46 are shown as interchangeable on the mount 42, it should be appreciated that a plurality of mounted heads, including the head 40 and tip-tilt assembly 46, can be mounting on to a single mounting assembly designed to allow any one of the heads and assemblies to be moved into the proper position relative to the axis 34.

The beams from the test and reference leg recombine at the beamsplitter 30. The recombined beam is reflected along the axis 50 off the reflecting surface of the assembly 52 and propagates through polarizer 54 to the imaging optics of the imaging optics assembly 56 (which includes a spatial filter, e.g., a field stop 58) through a mounting assembly, such as tube 60, onto a suitable imaging device such as the camera assembly 62. The latter, which preferably includes a detector array (not shown) for detecting an image of the recombined beam for subsequent analysis or display. The imaging optics of assembly 56 serve at least two purposes: (1) to magnify the recombined beam to match the format of the detector array and (2) to image the pupil of the CUT on to the detector array. The imaging optics of the assembly 56 are preferably contained in a modular assembly so that it can be, readily removed and replaced with one or more other imaging optic assemblies for operation at different magnifications, conjugates or wavelengths.

Ghost images arising from non-tilted reflecting surfaces are preferably suppressed by using polarization techniques. In particular, ¼-waveplates 64 and 66 are respectively placed between the phase shifting reflection surface 36 and the beamsplitter 30, and between beam splitter 30 and the imaging optics 44 of the head 40, while polarizer 54 is disposed between the assembly 52 and the imaging optics 56. The ¼-waveplates 64 and 66 and polarizer 54 form an optical isolator that suppresses ghost images. In addition, the front and back surfaces of the beamsplitter 30 are preferably angled by approximately 2°. This results in an angular separation between the desired reflection and the ghost reflection coming from the second surface of the beamsplitter 30. The ghost reflections are then blocked by field stop 58 placed in the focal plane of the imaging optics of the assembly 56. The spatial filter 58 is preferably removable to aid in alignment and is then re-inserted prior to making a measurement. Also, field stops of varying diameters can be used to optimize its performance relative the magnification of the imaging optics of the assembly 56.

The camera assembly 62 is preferably mounted on a mounting structure shown in the form of a mounting tube 60, which is adjustable in length. The tube 60 can also be replaced as a unit. The adjustability and replaceability permits the interferometer to operate with a wide variety of detector arrays and at multiple wavelengths.

Modification to Permit Testing of Semi-transparent Objects.

Additional problems are created when testing semi-transparent objects (glass spheres, for example) due to the additional reflection that arises from the back surface of the CUT. For example, the reflection from the back surface of a glass sphere coincides with the reflection from the front surface. Both reflections interfere with one another and with the test beam which, in turn, leads to an erroneous measurement. According to one aspect of the invention, the interferometer can be modified to allow the system to measure semi-transparent objects. This embodiment includes an illumination source having a short coherence length and a interferometer head preferably in the form of a modified Linnik interferometric microscope objective.

Figure 2:
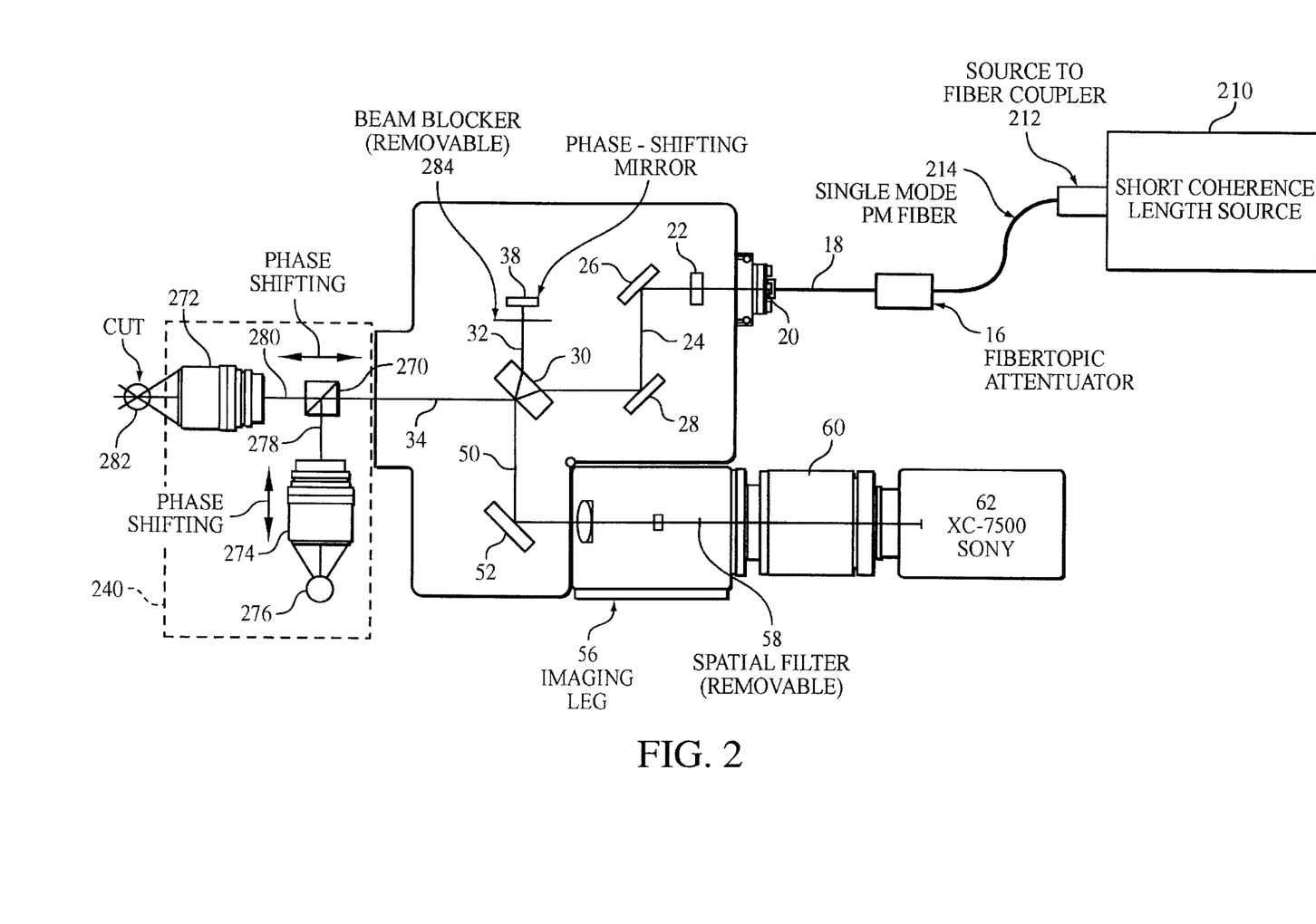
FIG. 2 is a top schematic view of a second embodiment of an interferometer system incorporating the principles of the present invention.

A preferred embodiment employing this modification is shown in FIG. 2. The illumination is provided by a source 210 having low temporal coherence (e.g., tungsten lamp, arc lamp, a super-radiant light-emitting diode, etc.). High spatial coherence is required and is obtained by limiting the effective diameter of the source with a suitable aperture (not shown), for example, by using a pinhole or a fiberoptic cable. The source may be coupled to the interferometer with a fiberoptic cable as indicated. Alternatively, it may be directly mounted to the interferometer assembly.

The objective assembly 240 is attached as indicated. The objective assembly comprises a beamsplitter 270, a pair of matched microscope objectives 272, 274 and a reference sphere 276. As shown in FIG. 2, one arm of the objective assembly defines the reference beam axis 278, forms the reference leg of the interferometer and includes an opaque reference sphere 276. The semi-transparent object sample, the semi-transparent CUT, shown at 282, is positioned on the imaging beam axis 280 defining and located in the test leg. The object sample is precisely held in position relative to the axis 34 and the objective lens assembly 272 by an a suitable assembly attached to the head comprising the objective assembly, such as the vacuum chuck assembly describe in greater detail in connection with FIGS. 5 and 6.

The phase shifting mirror assembly with reflecting surface 38 is not used in this configuration and is blocked by placing an opaque screen 284 in an attenuator mount (not shown). However, phase-shifting is required to obtain a measurement of the surface profile of the CUT 282. Phase shifting is preferably accomplished in either one of two ways: (1) phase shifting may be applied by moving the reference leg (i.e., objective 274 and reference sphere 276 as a unit), or (2) phase shifting may be applied by moving the objective assembly 272 as a unit relative to the CUT 282. In either case the phase shifting is applied by using a control mechanism for controlling the linear movement with fine resolution (for example, by using a piezo electric actuator).

The interference fringes formed in the image provided by this configuration and projected onto the detector array of camera 62 are highly localized due to the short coherence length of the source. As a result, the back'surface reflection does not interfere with either the front surface reflection or with the reference beam. Hence, the front surface of a semi-transparent CUT can be measured because it is not affected by the reflection from the back surface.

Use of the Interferometer with an Automated Multi-axis Stage Assembly.

Figure 3:
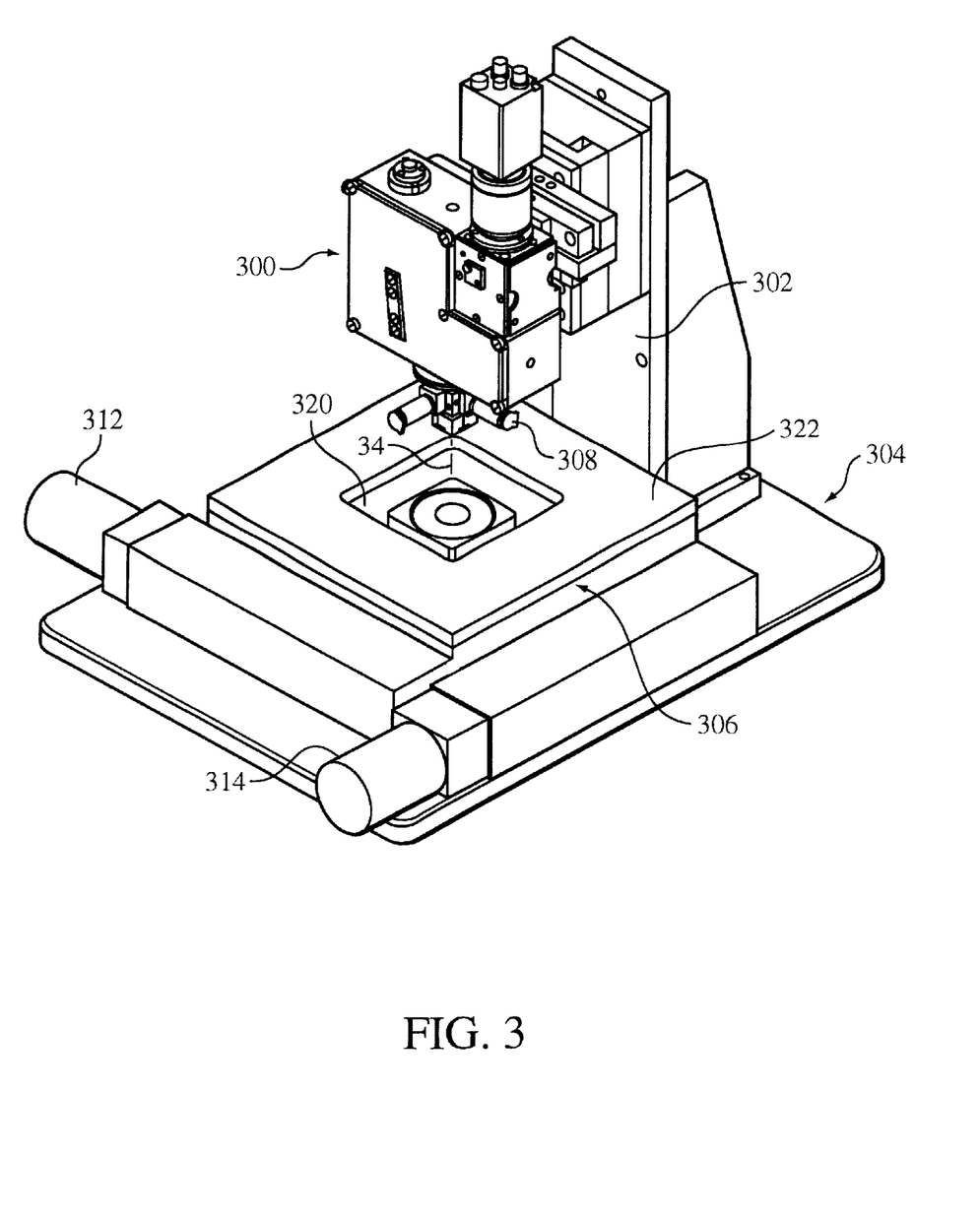
FIG. 3 is an isometric view of a third embodiment of the interferometer system incorporating the principles of the present invention.
Figure 4:
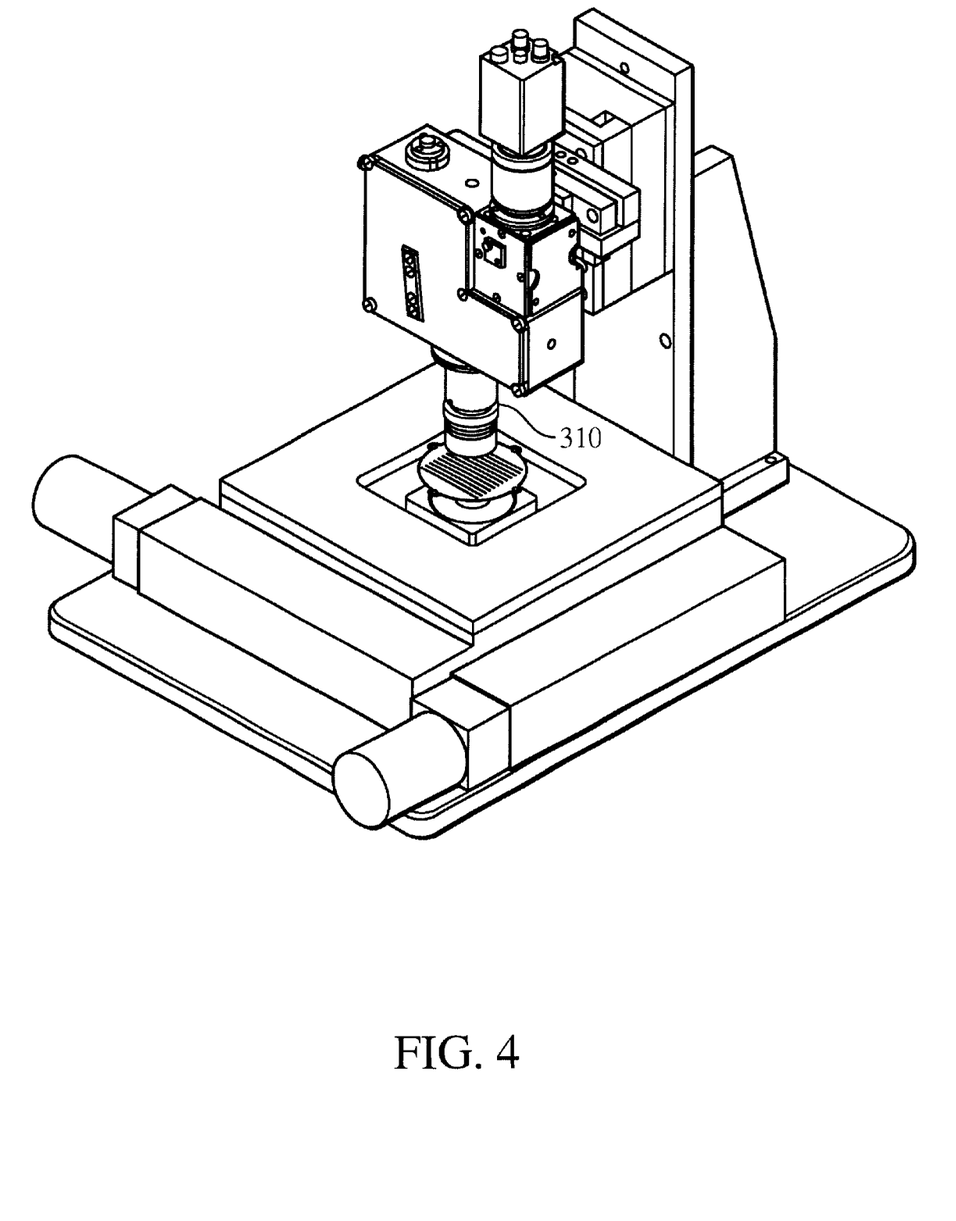
FIG. 4 is an isometric view of a fourth embodiment of the interferometer system incorporating the principles of the present invention.

In accordance with one embodiment of the present invention, as shown in FIGS. 3 and 4, the interferometer head of the interferometer 300 is attached to a vertical column 302 of a stage assembly 304 including the stage support 306 so that the test beam is directed down towards the object under test. The interferometer 300 can be moved in the vertical or z-direction relative to the vertical column 302 and thus stage assembly 304. Vertical movement is preferably accomplished with a stepping motor (not shown). As previously described, the assembly 304 includes the option of having different interferometer heads attached thereto. For example, one head is equipped with a vacuum chuck for picking up and holding individual CUTs provided on the stage and is shown at 308 in FIG. 3, while another head shown at 310 is equipped with suitable optics and adapted to sequentially view micro-optical components positioned on the stage and is shown in, FIG. 4. As shown in FIGS. 3 and 4 the stage support, 306 can be driven in each of two orthogonal directions (considered the X and Y directions, and thus the stage can be referred to as an "XY" stage), substantially normal to the test beam, respectively by stepping motors 312, 314. The position of the stage in each of the X and Y directions, relative to the test beam, is sensed by suitable devices, such as linear encoders (not shown in FIGS. 3 and 4), which in turn provide position feedback as to the two relative positions. A tip and tilt adjustment mechanism is incorporated into the interferometer head 308 of the interferometer 300 so that the angle of incidence of the beam axis of the test beam can be adjusted and the imaging beam optical axis 34 of the transmitted beam is coincident with the optical axis of the CUT, i.e., the CUT can be geocentrically positioned. This allows the interferometer's test beam to be nulled (made perpendicular) to the CUT.

Figure 5:
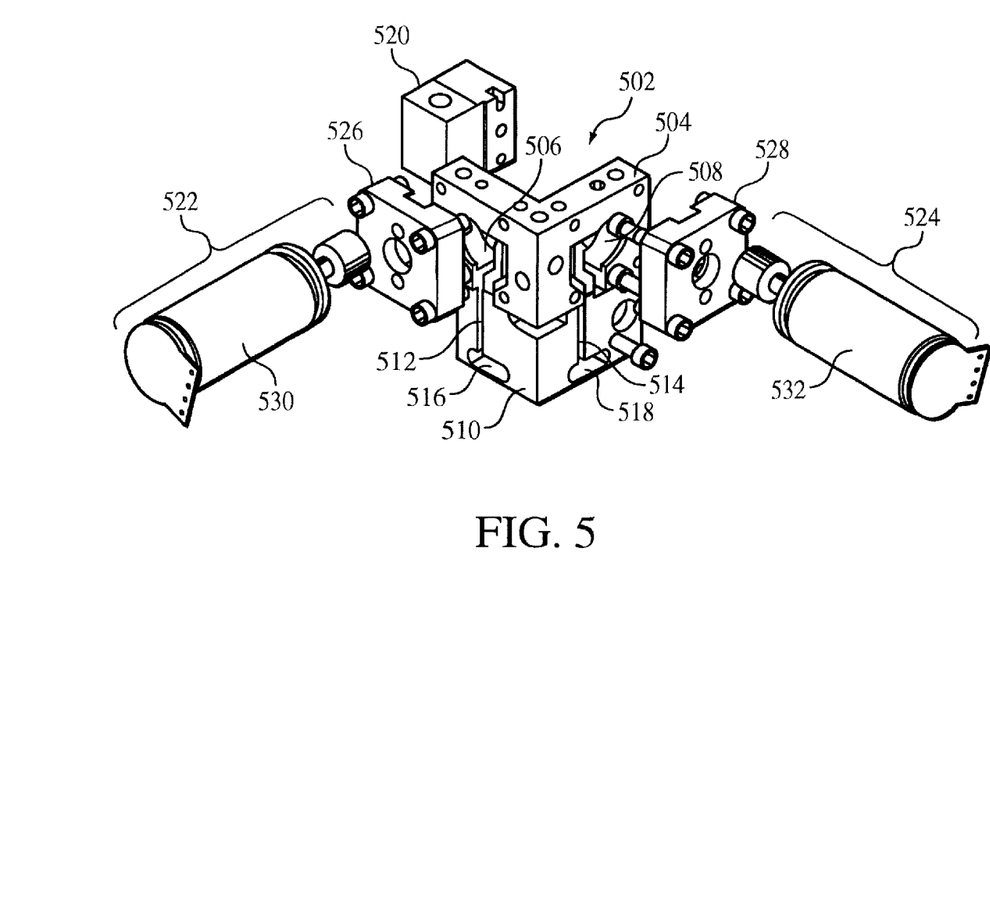
FIG. 5 is a isometric, exploded view of the vacuum chuck attachment for the interferometer system.
Figure 6:
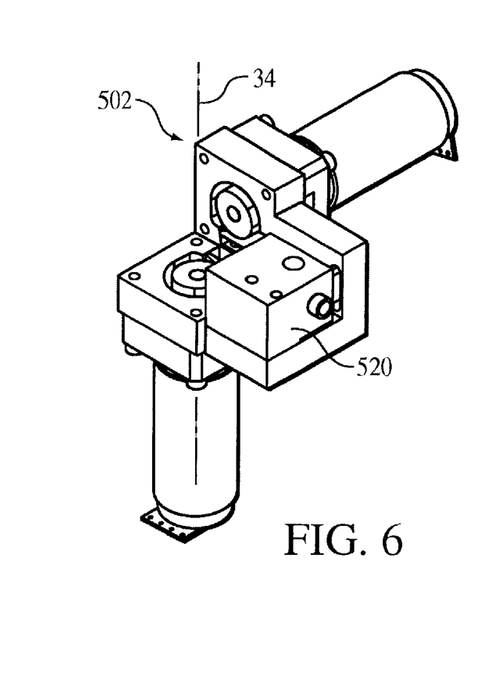
FIG. 6 is an isometric assembled bottom view of the vacuum chuck attachment shown in FIG. 5.

The vacuum chuck assembly forming the tip and tilt mechanism of the head 308 of FIG. 3 is shown in greater detail in FIGS. 5 and 6. The mechanism 502 is mounted relative to the beam axis 34, and comprises an upper L-shaped block section 504 having a pair of cam follower openings 506, 508, and a lower L-shaped block 510 aligned with the upper L-shaped block section 504 and formed with the respective key slots 512, 514 including bottom relief openings 516, 518. The mechanism 502 also comprises a pneumatic head 520 and a pair of servomotor assemblies 522, 524. Each servomotor assembly 522, 524 comprises a mounting collar 526, 528 for supporting the respective servomotor 530, 532. The end of the shaft of each servomotor 530, 532 is respectively provided with a cam element 534, 536. The assemblies 522, 524 are mounted to the upper L-shaped block second 504 so that the cam elements 534, 536 are respectively disposed in the cam follower openings 506 and 508 so that as each of the servomotors 530, 532 rotates, the respective cam element 534, 536 turns within the corresponding opening 506, 508 causing a portion of the bottom block section 510 to compress so as to move the opposite portions of the corresponding key slots 512 and 514 to move toward one another, such movement being allowed because of the respective relief openings 516 and 518. The compression within the block is released when the cam elements are rotated by the motors in the opposite direction. The pneumatic head 520 is positioned relative to the L-shaped block sections 504 and 510 so as to hold a micro-optical component into contact with the L-shaped block so that rotation of the two cam elements within the corresponding openings results in the component moving in two mutually orthogonal directions laterally relative to the beam axis 34 (as best seen in FIG. 6) and hence effect the tip and tilt movements.

Referring again to FIG. 3, the stage assembly 300 allows precise positioning of the CUT on the axis 34 and thus the transmitted beam. The rotation center of this adjustment is preferably located above the top surface 322 of the stage. This allows the device under test to be positioned at the rotation center, thus eliminating translation in the beam when tip or tilt adjustments are made.

Referring again to FIGS. 3 and 4, the stage support 306 is preferably an open-frame design so as to include an opening area 320 below the top surface 322 of stage support 306, which allows positioning of CUTs in the optical axis 34 of the transmitted beam, above and/or below the top surface 322.

As shown in FIG. 4, the interferometer head 308 of FIG. 3 may be removed and an alternative interferometer head 310 provided. The head 304 can include converging, collimated or diverging optics, and adjustable lenses to accommodate two or more of these options. As mentioned above, the different heads may be mounted in one assembly and attached to the interferometer so as to permit selective movement of head into and out of the optical axis 34.

Figure 7:
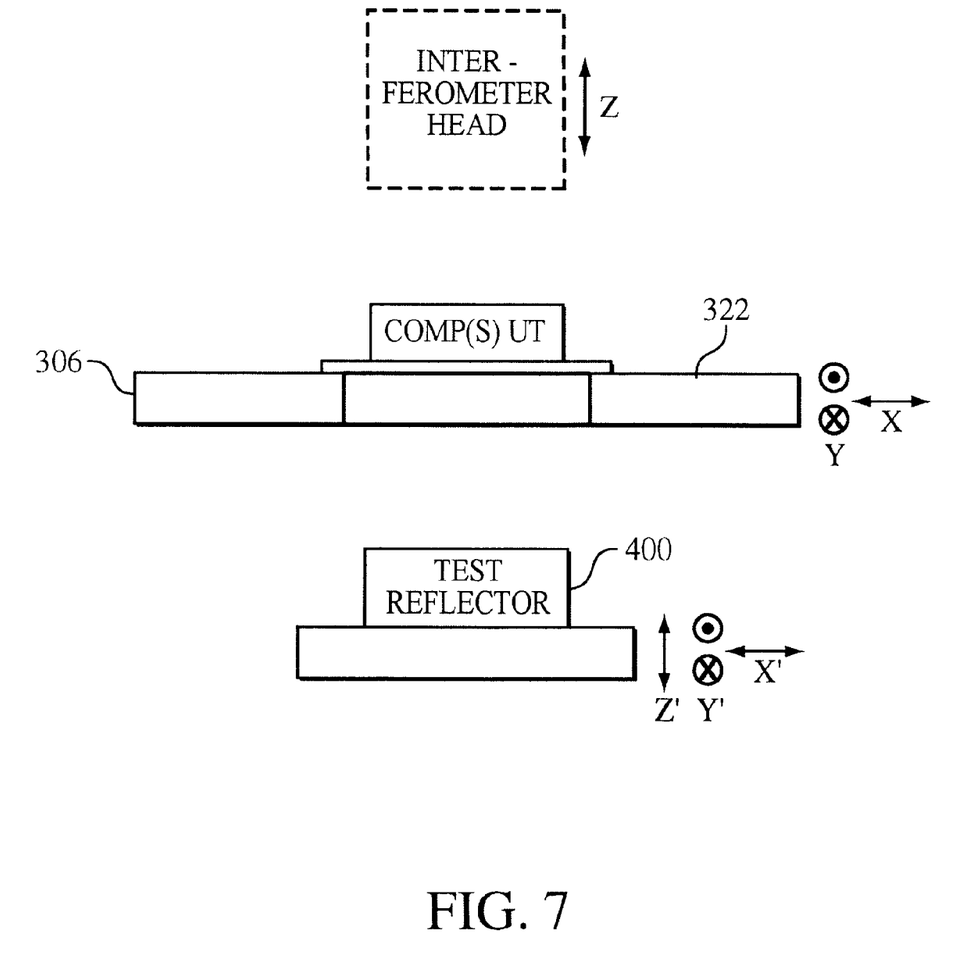
FIG. 7 is a schematic view showing the relative relationship of the interferometer head, XY stage and the test reflector used in the present invention.

As shown in FIG. 7, the interferometer is movable in the Z-direction, while the stage is movable in the X and Y directions. The test reflector 400 is positioned below the top surface 322 of the stage of the stage support 306. The test reflector 400 is preferably positioned on a mini-stage assembly, indicated at 402 so that it is independently movable in three orthogonal directions, X', Y' and Z', which may but need not be parallel or aligned with the X, Y and Z directions of the stage support 306. Movement in each of the X', Y' and Z' directions is effected by a separate servomotor (not shown in FIGS. 3, 4 or 7). It should be appreciated that the test reflector need not be movable, and, and although less preferably, alignment with the axis 34 can be achieved by controlling the positions of the interferometer and stage 306 in the X, Y and Z directions.

Figure 8:
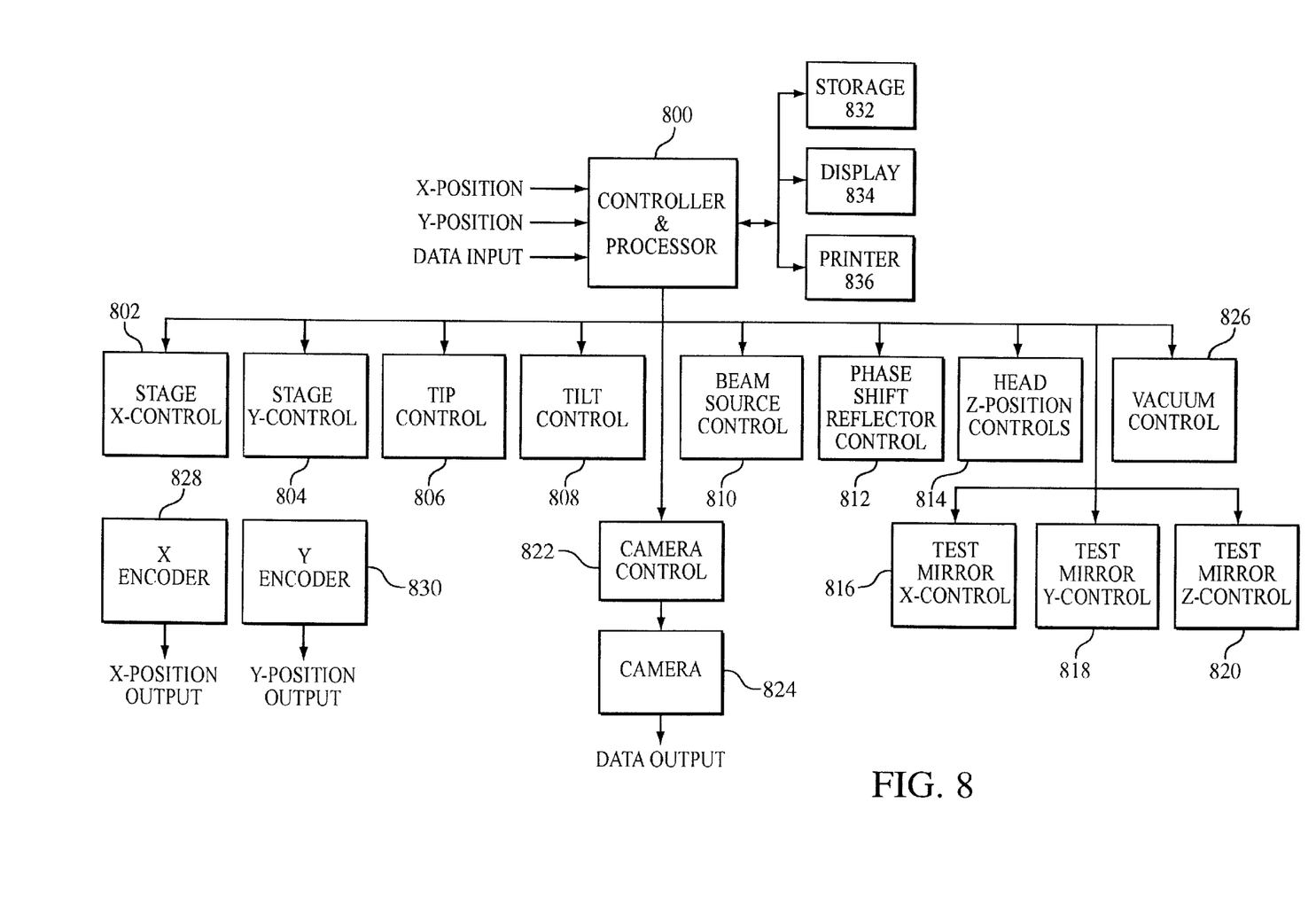
FIG. 8 shows a block diagram of an embodiment of the control and processing system of the present invention.

As shown in FIG. 8, the various movements of the parts of the system are controlled by a controller and/or processor 800, which can be in the form of a computer. The controller and/or processor 800 is suitably coupled to control the X and Y motors of the XY stage, as indicated at 802 and 804. The controller and/or processor 800 is also suitably coupled to the tip and tilt controls 806 and 808, the beam source control 810, the phase shift reflector control 812, the head Z-position control 814, the test mirror X', Y' and Z' controls 816, 818, 820, and the camera control 822 for controlling the camera 824 of the interferometer. Finally, the controller and/or processor 800 is connected to a vacuum control 826 for applying the vacuum to the vacuum chuck assembly. The X-position encoder 828 and Y-position encoder 830 provide feedback signals to the controller and/or processor 800 to indicate to the processor and/or controller 800 the position of the stage surface 322 relative to beam axis 34. Similarly, the data output of the camera 824 can also be provided to the controller and/or processor 800 for further processing and storage in storage 832, display on display 834 and/or printout on printer 838. Programs can be created to automatically, sequentially position the interferometer beam at multiple test sites on a wafer or gang fixture, make measurements, and log data.

Figure 9A:
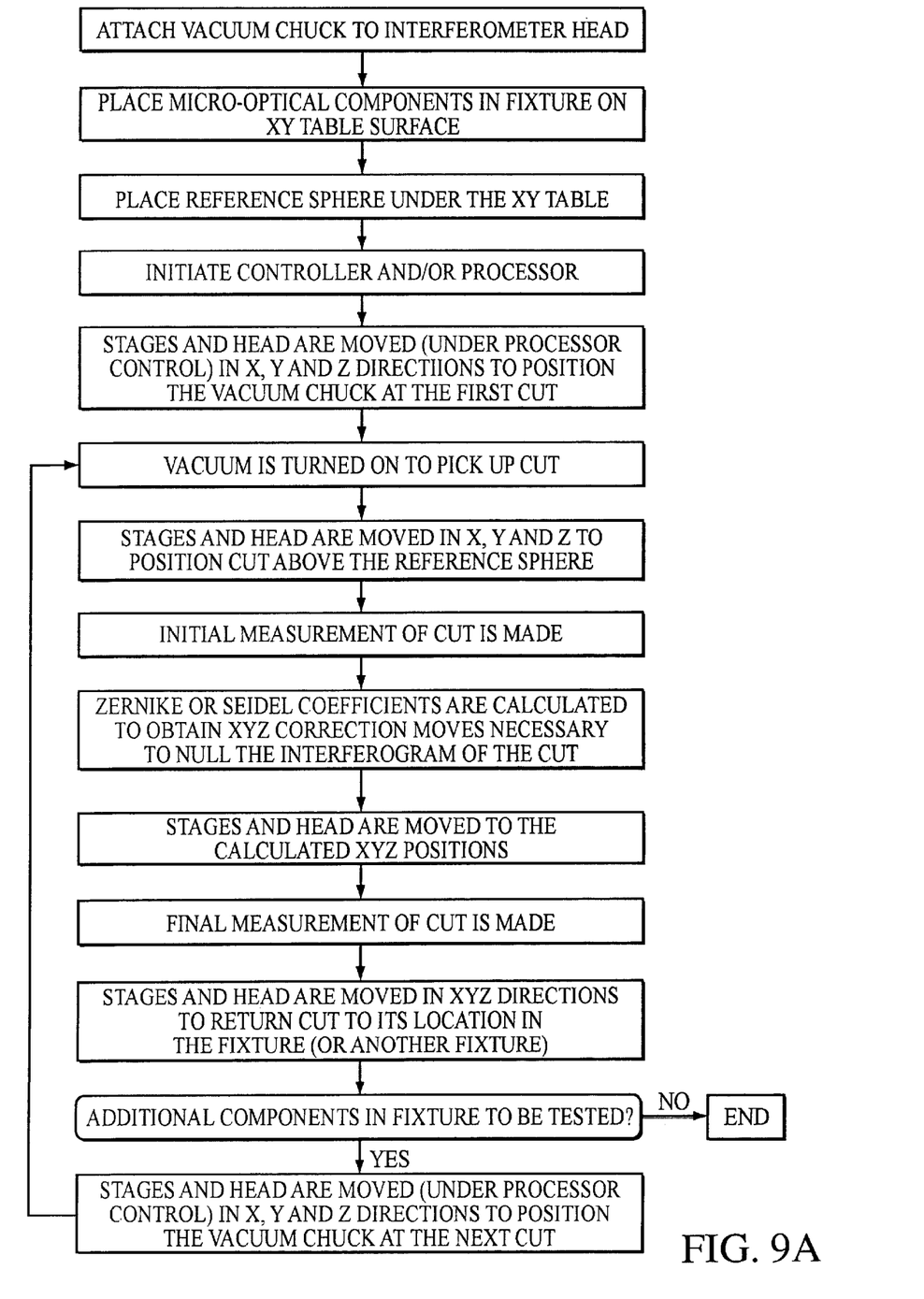
FIGS. 9A–9C are flow charts of the preferred operational steps in testing and characterizing micro-optical components.
Figure 9B:
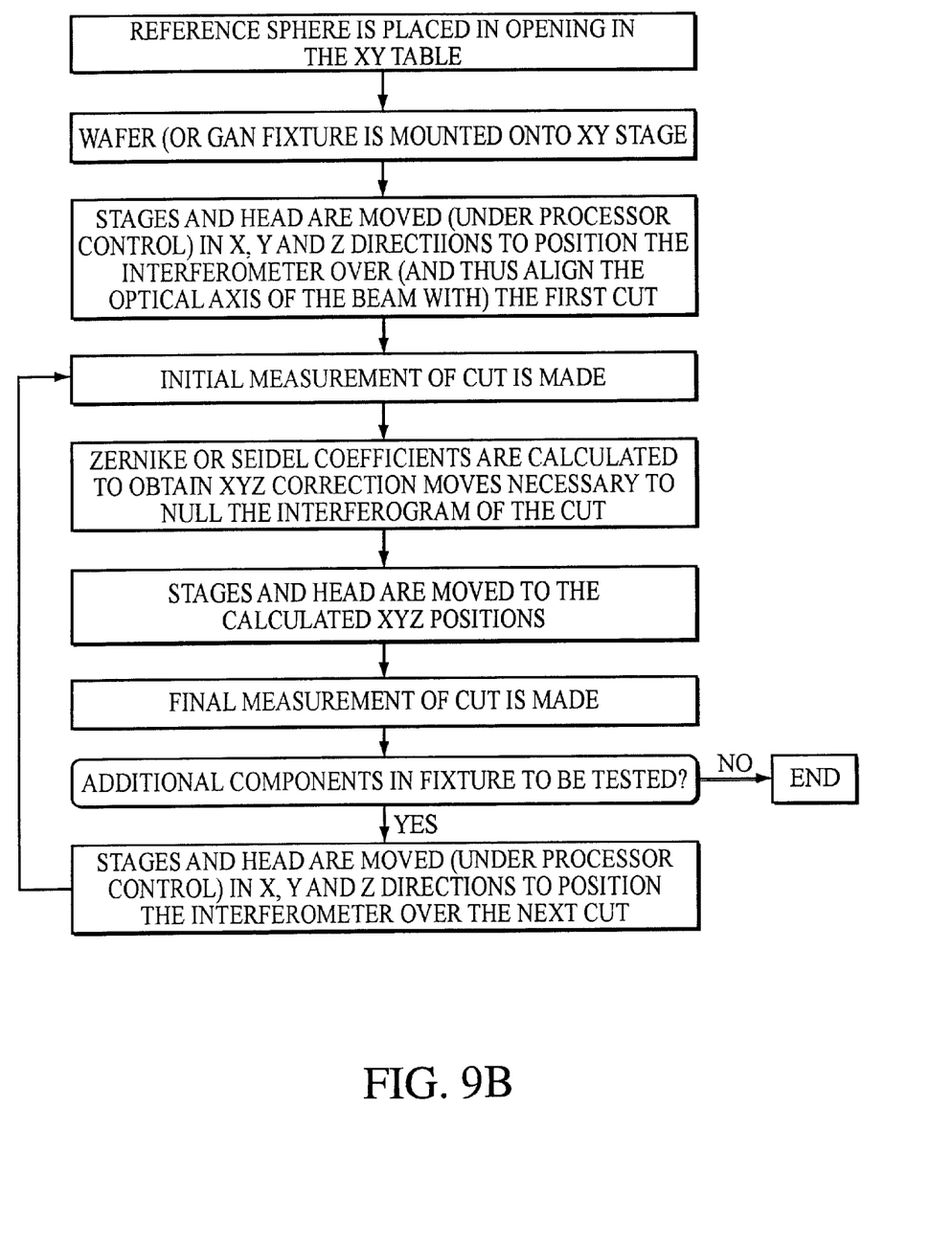
Figure 9C:
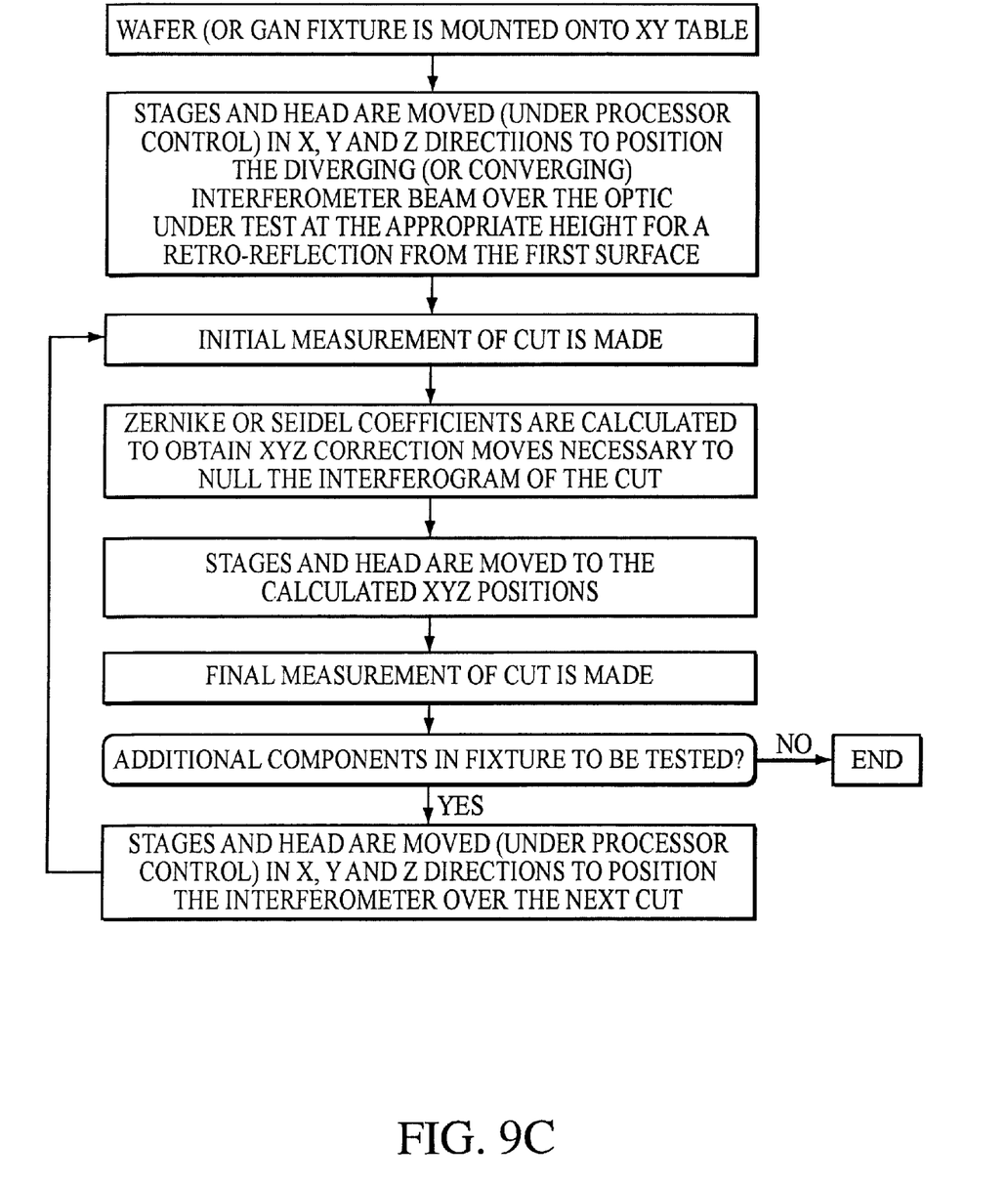

Various test configurations can be accommodated as illustrated, by way of example, in FIGS. 9A–9C.

In FIG. 9A a test configuration is illustrated for testing of individual micro-optical component in transmission with collimated beam. The following sequence describes a typical automated measurement.
  a) Individual micro-optical components to be tested are placed in an appropriate fixture (may be the shipping container) on the XY table surface.
  b) A vacuum chuck assembly such as shown in FIG. 3, is attached to the interferometer head.
  c) A reference sphere (or other reference reflective surface such as shown in FIG. 7) is placed under the XY table.
  d) The program of the controller and/or processor provides the following steps:
    a) Moves the stage and head in the X, Y and Z directions to position the vacuum chuck assembly at the first CUT to be tested.
    b) Turns on the vacuum, thus picking up the CUT.
    c) Moves the stage and head in the X, Y and Z directions to position the reference surface under the CUT.
    d) Takes a measurement.
    e) Uses Zernike or Seidel coefficients to calculate XYZ correction moves necessary to null the micro-optical component.
    f) Positions the stage in the X, Y and Z directions appropriately
    g) Takes a final measurement.
    h) Moves the stage and head in the X, Y and Z directions to return the CUT to the component's location in the fixture (or another fixture). Separate fixtures (or containers) for passed and failed optics can be used.

In addition to the transmitted wavefront quality, a measurement of focal length can be made. This is accomplished by noting the Z axis position when the optic is nulled over the reference surface. Slight deviations from null are accounted for by calculating the equivalent Z axis position change from the Zernike or Seidel coefficients. Optics with differing focal lengths will have corresponding different Z axis positions. This measures the focal length of each part, referenced to the surface in contact with the vacuum chuck. A micro-optical component with known focal length is used to calibrate the system. Alternatively, a cat's eye reflection from a flat reference surface can be used for the focal length measurement.

To calculate XY and Z axis correction moves to null the optic in the beam, the sensitivity of the appropriate Zernike or Seidel term per unit of axis motion is determined. Typically, the tilt, coefficients are used for X and Y axis positioning, and the focus coefficient for Z axis positioning. In test configurations where the tilt coefficients are not available (e.g. a cat's eye reflection), the astigmatism coefficients can be used for X and Y axis positioning. Computer programs are provided in the controller and/or processor to automate the measurement and calculation of the required sensitivities. These programs require that the user position the CUT at null using a manual joystick (or other means). The program then steps and takes measurements over some distance in each axis. The sensitivities are then calculated. Sensitivities are dependent on interferometer magnification and properties of the optic being tested.

The test configuration illustrated in FIG. 9B is an example of testing of the transmission characteristics of micro-optical components on a wafer (or gang fixture) with a collimated beam. The following sequence describes a typical automated measurement.
  a) The reference sphere (or other surface) is placed in the opening in the XY table. It is not attached to the XY table and therefore does not move with the table. It is positioned such that it is centered on the transmission axis of interferometer beam and located at the required vertical distance below the CUT. This can be accomplished by controlling the X', Y' and Z' movements of the reflective surface.
  b) The wafer (or gang fixture) is mounted on the top surface of the XY stage. An elevation stage can be mounted between the wafer and the XY stage to facilitate adjustment of the vertical distance from the micro-optical component under test to the reference sphere.
  c) A controller and processor is provided with a program that:
    a) Moves the stage in the X, Y and Z' directions so as to position the interferometer beam over (and thus align the optical axis of the beam with) the CUT.
    b) Takes a measurement.
    c) Uses Zernike or Seidel coefficients to calculate XYZ correction moves necessary to null the micro-optical component
    d) Positions the stage in the X and Y directions appropriately. The elevator stage may also be adjusted in this step.
    e) Takes a final measurement Finally, the test configuration of FIG. 9C is an example of the testing reflection characteristics (retro-reflection) the first surface of micro-optical components on a wafer (or gang fixture) with a diverging or converging beam. The following sequence describes a typical automated measurement.
  a) The wafer (or gang fixture) is mounted on the XY table.
  b) A controller and processor includes a program that:
  c) Moves the top surface in the XY table in the X and Y directions and the interferometer in the Z direction to position the diverging (or converging) interferometer beam over the optic under test at the appropriate height for a retro-reflection from the first surface.
    a) Takes a measurement
    b) Uses Zernike or Seidel coefficients to calculate XYZ correction moves necessary to null the micro-optical component.
    c) Positions the stage in the X and Y directions based on the correction move calculations.
    d) Takes a final measurement.

A radius of curvature measurement can also be made. This is accomplished by noting the Z axis position, as well as the residual focus from the Zernike or Seidel coefficients in the retro-reflection position. The Z axis is moved to sense a cat's eye reflection from the vertex of the first surface. A measurement then made and a Z axis (focus) correction move (tilt coefficients are not meaningful due to characteristics of the cat's eye reflection) is in turn calculated. The Z axis is then moved as necessary. A final measurement is then taken. A radius of curvature from change in Z axis position and residual Zernike or Seidel focus terms are then calculated.

There will be some tolerances associated with the fixture holding the wafer. This will result in rotational, lateral, and out-of-plane misalignments of the wafer to the instrument. These misalignments are compensated for by the following ways. The fixturing tolerances must be such that the first position on the wafer is always measurable. The correction moves will null the micro-optical and a final measurement made. The move to the next wafer location is made as a relative move from the current XYZ position. This assures that the various tolerances do not accumulate across the wafer. The fixture tolerances need only be good enough to assure that the measurement range of the instrument is not exceeded for a distance of one device pitch in X and one device pitch in Y. Using this technique eliminates the need for an operator to manually position at two or three locations on the wafer as would be the case for a traditional de-skew operation. A traditional de-skew operation can be done for fixtures that exceed the mentioned tolerances.

This instrument can also be used for the alignment of optical assemblies incorporating micro-optic components. The controller and processor can control a UV light source to bond the optical element(s) at the appropriate positions as determined by the Zernike, Seidel, or RMS wavefront error measurements.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. An interferometric characterization method, comprising:
    positioning a micro-optical component within an interferometer that derives measurement and reference wavefronts from a light source;
    automatically adjusting the position of the micro-optical component relative to a measurement beam path defined by the measurement wavefront to null the micro-optical component in the interferometer based on an initial measurement of the micro-optical component;
    acquiring interference images, each image comprising a superposition of the measurement wavefront reflected from the micro-optical component and the reference wavefront reflected from a reference surface; and
    characterizing the micro-optical component based on the interference images.

2. A method, comprising:
    providing an array of micro-optical components comprising said micro-optical component; and
    sequentially characterizing each component using the method of claim 1.

3. The method of claim 2, further comprising manually locating a first micro-optical component and a second micro-optical component in the micro-optical component array with the interferometer and detector prior to sequentially characterizing the micro-optical component array.

4. The method of claim 2, wherein characterizing the micro-optical component comprises measuring a surface profile of the micro-optical component.

5. The method of claim 2, wherein characterizing the micro-optical component comprises measuring a radius of curvature of the micro-optical component.

6. The method of claim 2, wherein characterizing the micro-optical component comprises measuring a focal length of the micro-optical component.

7. The method of claim 2, further comprising moving the reference surface in a direction parallel to a reference beam path defined by the reference wavefront to shift a phase between the measurement and reference wavefronts while acquiring the interference images.

8. The method of claim 2, wherein light source has a long coherence length.

9. The method of claim 2, wherein the light source has a short coherence length.

10. The method of claim 2, wherein automatically adjusting the position of the micro-optical component comprises adjusting a tilt angle of the micro-optical component relative to the measurement beam path.

11. The method of claim 10, wherein automatically adjusting position the micro-optical component comprises moving the interferometer relative to the micro-optical component in a direction parallel to the measurement beam path.

12. The method of claim 11, wherein automatically adjusting the position the micro-optical component comprises moving the micro-optical component along at least one of two mutually orthogonal directions both substantially normal to the measurement beam path.

13. The method of claim 2, further comprising determining at least one Seidel coefficient or Zernike coefficient from the initial measurement, and automatically adjusting the position of the micro-optical component relative to the measurement beam path based on the Seidel or Zernike coefficient.

14. The method of claim 2, wherein the micro-optical component is positioned using a vacuum chuck.

15. The method of claim 2, wherein automatically adjusting the position of the micro-optical component comprises adjusting an angle between the measurement beam path and an optical axis of the micro-optical component.

16. The method of claim 15, wherein the angle of incidence of the measurement wavefront relative to the optical axis of the micro-optical component is adjusted by an amount related to a trigonometric ratio of at least one Seidel or Zernike coefficient.

17. An interferometric system for characterizing micro-optical components, comprising:
    a light source;
    an interferometer which during operation receives light from the light source and interferes a measurement beam that is reflected from a target micro-optical component and a reference beam that is reflected from a reference surface to produce an interference pattern;
    a component support assembly for holding the target micro-optical component and positioning the target micro-optical component relative to the measurement beam;
    a detector positioned to detect the interference pattern generated by the interferometer; and
    a system controller connected to the detector and at least one of the component support assembly and the interferometer and programmed (a) to automatically null the interferometric system by adjusting the measurement beam and the target micro-optical component relative to each and (b) to measure a characteristic of the target micro-optical component using the interference pattern produced by the nulled interferometric system for that target micro-optical component.

18. The interferometric system of claim 17, wherein the component support assembly is configured to hold an array of micro-optical components and the system controller is programmed to cause the component support assembly to automatically and sequentially select each component of the array of micro-optical components as the target micro-optical component and for each target micro-optical component to perform steps (a) and (b).

19. The interferometric system of claim 18, wherein the component support assembly further comprises a pair of stepping motors for translating the array of micro-optical components in two mutually orthogonal directions both substantially normal to the measurement beam.

20. The interferometric system of claim 19, wherein the component support assembly automatically and sequentially selects each component by moving each component in the micro-optical component array relative to the measurement beam path with the stepping motors.

21. The interferometric system of claim 18, wherein the system controller is programmed to determine at least one Seidel or Zernike coefficient from an initial interference measurement and to null the target micro-optical component based on the at least one Seidel or Zernike coefficient.

22. The interferometric system of claim 18, wherein the reference surface is a curved reference surface.

23. The interferometric system of claim 22, wherein the curvature of the curved reference surface is related to a nominal shape of the micro-optical component.

24. The interferometric system of claim 22, wherein the curved reference surface is a spherical surface.

25. The interferometric system of claim 18, wherein the light source has a long coherence length.

26. The interferometric system of claim 18, wherein the light source has a short coherence length.

27. The interferometric system of claim 18, further comprising a housing mounted on a translation stage, wherein at least part of the interferometer is contained in the housing and the translation stage is configured to move the housing relative the mounting assembly in a direction parallel to the measurement beam.

28. The interferometric system of claim 18, wherein the component support assembly comprises a vacuum chuck for positioning the target micro-optical component relative to the measurement beam.

29. The interferometric system of claim 18, wherein the component support assembly comprises a tip and tilt adjustment mechanism for adjusting an angle between the measurement beam and an optical axis of the target micro-optical component.

30. The interferometric system of claim 18, further comprising a second reference support for positioning a second reference surface to reflect light transmitted through the target micro-optical component back through the target micro-optical component.

31. The interferometric system of claim 30, wherein the second reference support is movable in a direction parallel a path defined by the light transmitted through the target micro-optical component.

32. The interferometric system of claim 31, wherein the second reference support is also movable in two mutually orthogonal directions normal to the path defined by the light transmitted through the target micro-optical component.

33. The interferometric system of claim 32, wherein the system controller is programmed to position the second reference surface relative to a focal point of the target micro-optical component by moving the second reference support.

* * * * *

UNITED STATES PATENT AND TRADEMARK OFFICE
CERTIFICATE OF CORRECTION

PATENT NO. : 6,515,750 B1
DATED : February 4, 2003
INVENTOR(S) : Phillip H. Malyak et al.

It is certified that error appears in the above-identified patent and that said Letters Patent is hereby corrected as shown below:

Title page,
Item [75], Inventor, replace "Holh" with -- Hohl --
Item [56], OTHER PUBLICATIONS, "D. Malacara amd S.L. DeVore," reference, replace "fittimg" with -- fitting --
Item [57], ABSTRACT,
Lines 1 and 8, replace "a" with -- an --

Column 1,
Line 28, replace "The with" with -- With the --

Column 3,
Line 9, replace "components" with -- component, --

Column 4,
Line 7, replace "a" with -- an --

Column 5,
Line 12, after "separate" delete "b" and insert -- beams directed along two separate optical --
Line 45, remove "," after "40"
Line 66, remove "," after "be"

Column 6,
Line 39, replace second occurrence of "a" with -- an --
Line 62, delete "an"
Line 64, replace "describe" with -- described --

Column 7,
Line 15, after "back" delete """
Line 38, delete "," after "in"
Line 39, delete "," after "support"

Column 8,
Line 54, delete second occurrence of "and"

Column 9,
Line 24, after "assembly" insert -- , --

UNITED STATES PATENT AND TRADEMARK OFFICE
CERTIFICATE OF CORRECTION

PATENT NO.    : 6,515,750 B1
DATED         : February 4, 2003
INVENTOR(S)   : Phillip H. Malyak et al.

It is certified that error appears in the above-identified patent and that said Letters Patent is hereby corrected as shown below:

<u>Column 10,</u>
Line 33, delete """ after "Z"

Signed and Sealed this

Nineteenth Day of August, 2003

JAMES E. ROGAN
*Director of the United States Patent and Trademark Office*